(12) United States Patent
Jeong et al.

(10) Patent No.: US 12,502,119 B2
(45) Date of Patent: Dec. 23, 2025

(54) ELECTROCARDIOGRAM DATA PROCESSING METHOD, AND NON-TRANSITORY RECORDING MEDIUM STORING INSTRUCTION SET FOR EXECUTING THE METHOD

(71) Applicant: ATSENS CO., LTD., Gyeonggi-do (KR)

(72) Inventors: Jong Ook Jeong, Gyeonggi-do (KR); Kab Mun Cha, Gyeonggi-do (KR); Tae Youn Kim, Gyeonggi-do (KR); Byung Jin Moon, Gyeonggi-do (KR)

(73) Assignee: ATSENS CO., LTD., Gyeonggi-Do (KR)

( * ) Notice: Subject to any disclaimer, the term of this patent is extended or adjusted under 35 U.S.C. 154(b) by 442 days.

(21) Appl. No.: 18/068,291

(22) Filed: Dec. 19, 2022

(65) Prior Publication Data

US 2024/0008790 A1 Jan. 11, 2024

(30) Foreign Application Priority Data

Jul. 7, 2022 (KR) .......................... 10-2022-0083813

(51) Int. Cl.
*A61B 5/35* (2021.01)
*A61B 5/00* (2006.01)
*A61B 5/347* (2021.01)

(52) U.S. Cl.
CPC ................ *A61B 5/35* (2021.01); *A61B 5/347* (2021.01); *A61B 5/7221* (2013.01)

(58) Field of Classification Search
CPC .......... A61B 5/35; A61B 5/347; A61B 5/7221
USPC ......................................................... 600/509
See application file for complete search history.

(56) References Cited

U.S. PATENT DOCUMENTS

2005/0281439 A1* 12/2005 Lange ...................... G07C 9/37
382/115
2021/0251550 A1 8/2021 Cha et al.

FOREIGN PATENT DOCUMENTS

| KR | 20150020955 A | 2/2015 |
|---|---|---|
| KR | 20210069931 A | 6/2021 |
| KR | 20210105103 A | 8/2021 |
| KR | 20210147371 A | 12/2021 |
| KR | 20220008448 A | 1/2022 |
| KR | 20220012736 A | 2/2022 |

OTHER PUBLICATIONS

"Notice of Allowance Issued to Corresponding Korean Application No. 10-2022-0083813", Dec. 1, 2022, 3 Pages.

* cited by examiner

*Primary Examiner* — Nadia A Mahmood
(74) *Attorney, Agent, or Firm* — Bridgeway IP Law Group, PLLC; Sang Ho Lee; Hyun Woo Shin

(57) ABSTRACT

The disclosure relates to an electrocardiogram (ECG) data processing method and a non-transitory recording medium storing an instruction set for executing an ECG data processing method, and more particularly, to a method of extracting an analysis-required section from an ECG signal by considering a data value or a morphological pattern of the ECG signal.

18 Claims, 14 Drawing Sheets

ELECTROCARDIOGRAM DATA PROCESSING METHOD, AND NON-TRANSITORY RECORDING MEDIUM STORING INSTRUCTION SET FOR EXECUTING THE METHOD

CROSS-REFERENCE TO RELATED APPLICATION

This application is based on and claims priority under 35 U.S.C. § 119 to Korean Patent Application No. 10-2022-0083813, filed on Jul. 7, 2022, in the Korean Intellectual Property Office, the disclosure of which is incorporated by reference herein in its entirety.

BACKGROUND

1. Field

The disclosure relates to an electrocardiogram (ECG) data processing method and a non-transitory recording medium storing an instruction set for executing an ECG data processing method, and more particularly, to a method of extracting an analysis-required section from an ECG signal by considering a data value or a morphological pattern of the ECG signal.

2. Description of the Related Art

A potential difference is induced by electrical depolarization and repolarization when the cardiac muscle contracts and relaxes. An electrocardiogram (ECG) refers to a data recording used to detect the potential difference by attaching a surface electrode to the skin. An ECG has a magnitude of tens of µV to several mV and a frequency band of less than 100 Hz.

Recently, an ECG signal has been measured by using a patch-type ECG measuring device. A patch-type ECG measuring device continuously records ECG signals for a long period of time (e.g., 7 to 14 days) while a patient lives his/her daily life. The amount of ECG signals recorded in this way is very large, and it takes a lot of time to analyze all of the ECG signals.

Also, an ECG signal includes a section for which analysis is not required due to noise at the time of measurement. Accordingly, it is necessary to sort sections in which analysis is required for ECG signals measured for a long period of time.

The above background technology is technical information held by the inventors for the derivation of the disclosure or obtained in the process of deriving the disclosure and may not necessarily be regarded as known technology disclosed to the general public prior to the filing of the disclosure.

SUMMARY

Provided are an electrocardiogram (ECG) data processing device, an ECG data processing method, and a computer program.

Additional aspects will be set forth in part in the description which follows and, in part, will be apparent from the description, or may be learned by practice of the presented embodiments.

According to an aspect of the disclosure, an electrocardiogram (ECG) data processing method includes receiving, by an ECG data processing device, an ECG signal, dividing, by the ECG data processing device, the ECG signal into a plurality of segments, analyzing a first segment from among the plurality of segments, and determining whether the first segment is a normal section by comparing a magnitude of at least one peak value of the first segment with a preset first threshold value, classifying, by the ECG data processing device, when the first segment not including peaks deviating from the threshold value is a normal section, the first segment as a normal section, and when the first segment is not a normal segment, extracting a morphological pattern of the first segment and classifying the first segment as a noise section by using the morphological pattern, and analyzing, by the ECG data processing device, segments of excluding the normal section, from among the plurality of segments.

The classifying of the first segment as a section other than the normal section may include, when a magnitude of at least one peak value of the first segment exceeds the first threshold value, determining peak regularity that is a morphological pattern of the first segment, and classifying the first segment having the peak regularity as an analysis-required section and classifying the first segment having no peak regularity as a noise section.

The ECG data processing method may further include classifying segments of a normal section included in the ECG signal by repeatedly performing the above process and calculating an amount of the segments of the normal section.

The ECG data processing method may further include, by repeatedly performing the determining and the classifying on the plurality of segments included in the ECG signal, collecting segments of a normal section or an analysis-required section included in the ECG signal, and calculating an analysis time for the segments.

The peak regularity may be determined based on a number of peaks included in the first segment or positions of the peaks in the first segment.

The first threshold value may be a value that is adaptively changeable for each of the plurality of segments.

The first threshold value for determining the normal section may be a data value of a peak of a second segment of the ECG signal or a value obtained by adding a certain magnitude to a data value of a template representing a third segment.

The ECG data processing method may further include increasing the first threshold value that is a criterion for determining the normal section, when the amount of the segments of the normal section is less than a preset minimum value, reducing and resetting the first threshold value, when the amount of the segments of the normal section is greater than a preset maximum value, and re-determining segments of a normal section by using the reset first threshold value.

The first threshold value that is a criterion for determining the normal section may be determined based on a maximum value of a difference value between data values of peaks of a previous segment.

The ECG data processing method may further include, after the dividing of the ECG signal into the plurality of segments, converting the plurality of segments of the ECG signal into a frequency domain.

The determining may include determining whether the first segment is a normal section, by comparing a data value of a frequency domain of the first segment with a second threshold value determined in the frequency domain.

The determining may include determining whether the first segment is a normal section by considering a ratio of harmonic frequencies, from among frequencies of peaks of the first segment.

According to another aspect of the disclosure, a non-transistor computer-readable medium stores a set of instructions for receiving an electrocardiogram (ECG) signal, dividing the ECG signal into a plurality of segments, analyzing a first segment from among the plurality of segments, and determining whether the first segment is a normal section by comparing a magnitude of a peak value of the first segment with a preset first threshold value, when the first segment not including peaks deviating from the first threshold value is a normal section, classifying the first segment as a normal section, and when the first segment is not a normal section, extracting a morphological pattern of the first segment and classifying the first segment as a section other than the normal section by using the morphological pattern, and analyzing segments of the normal section, from among the plurality of segments.

A computer program according to one or more embodiments may be stored in a medium to execute, by using a computer, any one of ECG data processing methods according to one or more methods.

In addition, provided are other methods, other systems, and computer-readable recording media recording thereon a computer program for executing the method.

Other aspects, features, and advantages of the disclosure will become more apparent from the drawings, the claims, and the detailed description.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
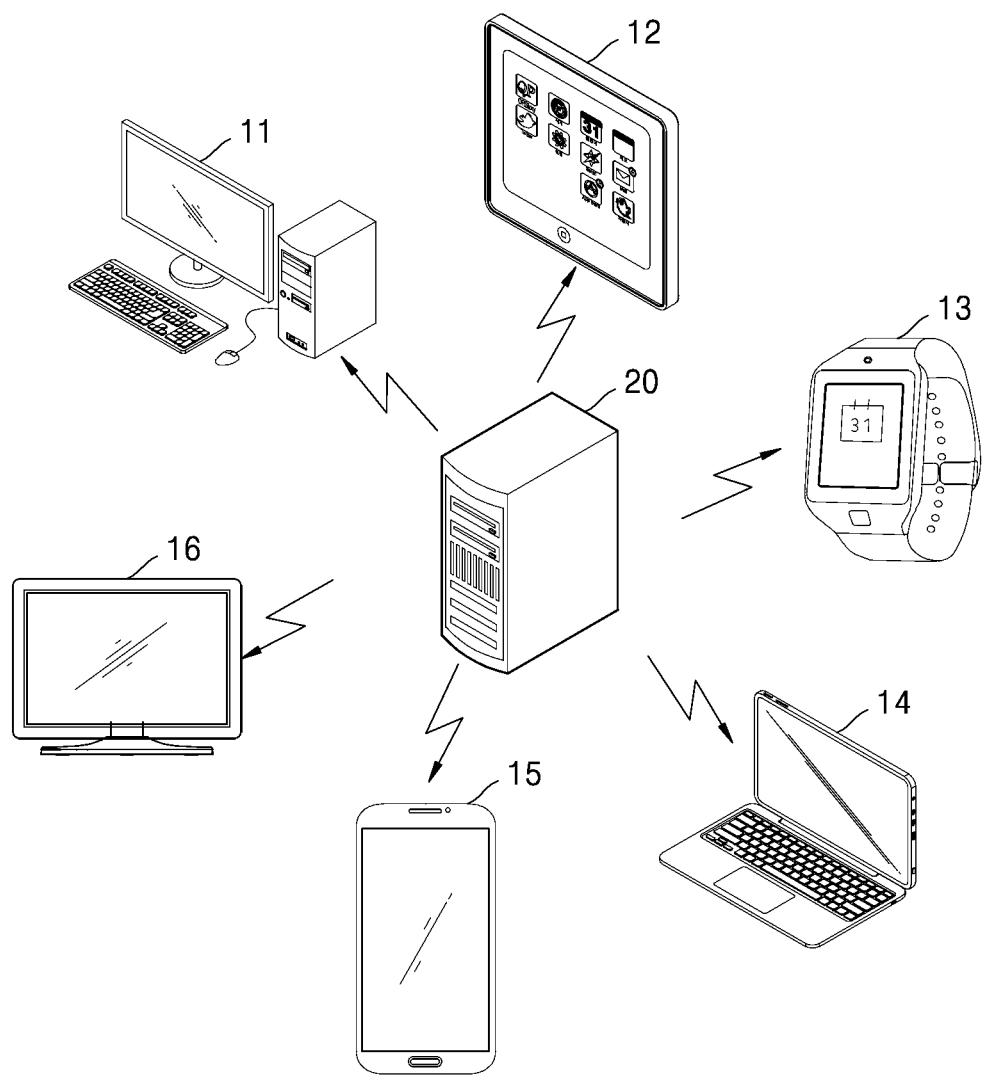
FIG. 1 is a view illustrating a medical network system including a server and a user terminal, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure will now be described more fully with reference to the accompanying drawings, in which exemplary embodiments of the disclosure are shown.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

The term "training" or "learning" used herein is not intended to refer to a mental activity such as a human educational activity but refers to performing neural network computing or machine learning through computing according to a procedure. The term "training" or "learning" refers to the study of computer algorithms that automatically improve through experiment.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that the terms "including," and "having," are intended to indicate the existence of the features or elements described in the specification and are not intended to preclude the possibility that one or more other features or elements may exist or may be added.

The term "module" used in the following embodiments may include a unit consisting of hardware, software, or firmware, and for example, may be interchangeably used with the term such as logic, a logical block, a component, or a circuit. The module may be an integrally configured component, or a minimum unit or part thereof, which performs one or more functions. For example, according to an embodiment, the module may be implemented as an application-specific integrated circuit (ASIC).

Sizes of components in the drawings may be exaggerated or contracted for convenience of explanation. For example, because sizes and thicknesses of elements in the drawings are arbitrarily illustrated for convenience of explanation, the disclosure is not limited thereto.

When a certain embodiment may be implemented differently, a specific process order may be different from the described order. For example, two consecutively described processes may be performed substantially at the same time or may be performed in an order opposite to the described order.

A biological signal that is a signal related to a living body may further include a biological signal such as body temperature, pulse, electrocardiogram (ECG), brain waves, respiratory rate, steps, stress, hormone, exercise, consumed calories, body fat, body moisture, blood sugar value, or blood pressure.

Hereinafter, an ECG signal may be an analog signal or a digital signal of a measured ECG signal.

An ECG signal, which is a digital signal, refers to numerically processing a signal to modify or improve an information signal and produce a desired result.

Hereinafter, an ECG signal for measuring and diagnosing the abnormal rhythm of the heart may be a measurement of an abnormal rhythm due to damage to conductive tissue or a neurotransmission line through which an electrical signal is transmitted.

FIG. 1 is a view illustrating a medical network system including a server and a user terminal, according to an embodiment.

A medical network system 1 of the disclosure may include a server 20 and one or more user terminals 11 to 16. The server 20 may provide various online activities through a network. The server 210 may simultaneously provide online activities to the one or more user terminals 11 to 16.

According to an embodiment, the server 20 may include, but is not limited to, a single server, a group of servers, or a cloud server. The server 20 may provide various medical online activities and may include a database in which data for network activities are stored. Also, the server 20 may include a payment server for generating and processing a signal processing calculation or payment event. As described above, the server 20 may be an ECG data processing device.

According to an embodiment, a network refers to a connection established (or formed) by using all communication methods and may refer to a communication network connected through all communication methods of transmitting and receiving data between a terminal and a terminal or between a terminal and a server.

All communication methods may include all communication methods such as communication through a certain communication standard, a certain frequency band, a certain protocol, and a certain channel. For example, the communication methods may include communication methods through BLE, Wi-Fi, Zigbee, 3G, 4G, 5G, LTE, and ultrasound, and may include short-range communication, long-range communication, wireless communication, and wired communication. However, the disclosure is not limited thereto.

According to an embodiment, a short-range communication method may refer to a communication method in which communication may be performed only when a device (e.g., a terminal or a server) performing communication is within a certain range, and may include, for example, Bluetooth and NFC. A long-range communication method may refer to a communication method in which a device performing communication may communicate regardless of a distance. For example, a long-range communication method may refer to a method in which two devices performing communication through a repeater such as an AP may communicate even at a certain distance or more and may include a communication method using a cellular network (e.g., 3G or LTE) such as a telephone or short message service (SMS). However, the disclosure is not limited thereto. When medical online activities are received by using a network, it may mean that communication may be performed between a server and a terminal through all communication methods.

One or more user terminals 11 to 16 used herein may include, but are not limited to, various electronic devices such as a personal digital assistant (PDA), a portable multimedia player (PMP), a navigation device, an MP3 player, a digital camera, a refrigerator, a washing machine, and a cleaner as well as a personal computer 11, a tablet 12, a wearable device 13, a laptop computer 14, a smartphone 15, and a TV 16. As described above, the one or more user terminals 11 to 16 may be ECG data processing devices.

According to an embodiment, online activities may include, but are not limited to, a data processing service, a data analysis service, a data distribution service, a data transaction service, a data processing service, and a data provision service.

According to an embodiment, the server 20 may sort analysis-required segments, by analyzing an ECG signal for each segment. The server 20 may sort analysis-required segments by considering a data value of a segment included in an ECG signal and a morphological pattern of the segment included in the ECG signal. A segment may be classified as a normal section, a noise section, or an analysis-required section according to a certain criterion. The server 20 may adjust the number of analysis-required segments by adaptively changing a threshold value or a morphological pattern which is a criterion for sorting or classifying segments. The server 20 may change the number of analysis-required segments by changing a criterion for analysis-required segments.

The server 20 may determine whether a segment is an analysis-required segment, by considering whether a magnitude of at least one peak value of a segment of an ECG signal is within an appropriate range or whether peaks of a segment outside the appropriate range regularly occur in time or frequency. The server 20 may upload stored data or a measured ECG signal in real time from a memory of a measuring device.

Also, according to an embodiment, the medical network system 1 may sort analysis-required segments, by analyzing an ECG signal for each segment. The medical network system 1 may generate a result of the analyzing as data. The medical network system 1 may sort analysis-required segments by considering a data value of a segment included in an ECG signal and a morphological pattern of the segment included in the ECG signal. The medical network system 1 may generate data about a morphological pattern of a segment, selected data, and the like. The medical network system 1 may adjust the number of analysis-required segments by adaptively changing a threshold value or a morphological pattern which is a criterion for sorting analysis-required segments. The medical network system 1 may change the number of analysis-required segments by changing a criterion for analysis-required segments.

The medical network system 1 may determine whether a segment is an analysis-required segment, by considering a magnitude of at least one peak value of a segment of an ECG signal is within an appropriate range or peaks of a segment outside the appropriate range regularly occur in time or frequency. The medical network system 1 may upload a measured ECG signal from a memory of a measuring device. The medical network system 1 may generate data for the selected segments. The medical network system 1 may generate a segment and data about the segment as output data and output it through an output device. The medical network system 1 may convert the generated data into output data and output it through an output device.

According to an embodiment, one of the one or more user terminals 11 to 16 may sort analysis-required segments, by analyzing an ECG signal for each segment. One of the one or more user terminals 11 to 16 may sort analysis-required segments by considering a data value of a segment included in an ECG signal and a morphological pattern of the segment included in the ECG signal. One of the one or more user terminals 11 to 16 may adjust the number of analysis-required segments by adaptively changing a threshold value or a morphological pattern which is a criterion for sorting analysis-required segments. One of the one or more user terminals 11 to 16 may change number of analysis-required segments by changing a criterion for analysis-required segments.

One of the one or more user terminals 11 to 16 may determine whether a segment is an analysis-required segment, by considering whether a peak value of a segment of an ECG signal is within an appropriate range or peaks of a segment have an irregular pattern. One of the one or more user terminals 11 to 16 may upload a measured ECG signal from a memory of a measuring device. One of the one or more user terminals 11 to 16 may generate a result of the analyzing as data. One of the one or more user terminals 11 to 16 may generate data about a morphological pattern of a segment, selected data, and the like. One of the one or more user terminals 11 to 16 may generate data for the selected segments. One of the one or more user terminals 11 to 16 may generate a segment and data about the segment as output data and output it through an output device. One of the one or more user terminals 11 to 16 may convert the generated data into output data and output it through an output device.

Figure 2:
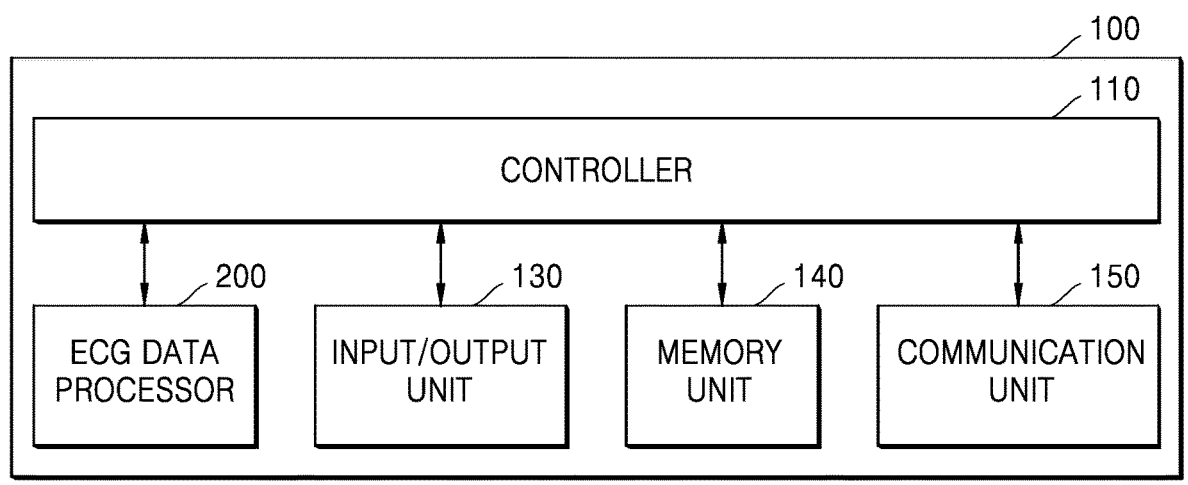
FIG. 2 is a diagram for describing a detailed configuration of an electrocardiogram (ECG) data processing device, according to embodiments.

FIG. 2 is a diagram for describing a detailed configuration of an ECG data processing device, according to embodiments.

As shown in FIG. 2, an ECG data processing device 100 according to some embodiments may include a controller 110, an input/output unit 130, a memory unit 140, a communication unit 150, and an ECG data processor 200. However, not all of the elements illustrated in FIG. 2 are essential elements of the ECG data processing device 100. The ECG data processing device 100 may include more or fewer elements than those illustrated in FIG. 2. The ECG data processing device 100 may be a user terminal, a server, a medical network system, or a separate device.

According to an embodiment, the controller 110 generally controls an overall operation of the ECG data processing device 100. For example, the controller 110 may generally control elements included in the ECG data processing device 100, by executing a program stored in the ECG data processing device 100.

According to an embodiment, the controller 110 may sort analysis-required segments, by analyzing an ECG signal for each segment. The controller 110 may sort analysis-required segments by considering a data value of a segment included in an ECG signal and a morphological pattern of the segment included in the ECG signal. The controller 110 may adjust the number of analysis-required segments by adaptively changing a threshold value or a morphological pattern which is a criterion for sorting analysis-required segments.

The controller 110 may determine whether a segment is an analysis-required segment, by considering whether a peak value of a segment of an ECG signal is within an appropriate range and peaks of a segment have an irregular pattern. The controller 110 may upload a measured ECG signal from a memory of a measuring device. The controller 110 is an element for generally controlling the ECG data processing device 100. In detail, the controller 110 controls an overall operation of the ECG data processing device 100 by using various programs stored in the memory unit 140 of the ECG data processing device 100. For example, the controller 110 may include a central processing unit (CPU), a random-access memory (RAM), a read-only memory (ROM), and a system bus. The ROM is an element in which a set of instructions for system booting is stored, and the CPU is configured to copy an operating system (O/S) stored in the ECG data processing device 100 to the RAM according to instructions stored in the ROM, execute the O/S, and boot a system. When the booting of the system is completed, the CPU may copy various stored applications to the RAM and perform various operations by executing the applications. Although the ECG data processing device 100 includes only one CPU, the ECG data processing device 100 may include a plurality of CPUs (or DSPs or SoCs) according to an embodiment.

According to an embodiment, the controller 110 may be implemented as a digital signal processor, a microprocessor, or a time controller (TCON) for processing a digital signal. However, the disclosure is not limited thereto, and the controller 110 may include or be defined by at least one of a central processing unit (CPU), a micro-controller unit (MCU), a micro-processing unit (MPU), a controller, an application processor (AP), or a communication processor (CP). Also, the controller 110 may be implemented as a system on chip (SoC) with a processing algorithm, a large-scale integration (LSI), or a field programmable gate array (FPGA).

According to an embodiment, the input/output unit 130 may display an interface generated by the ECG data processing device 100 by the memory unit 140. According to an embodiment, the input/output unit 130 may display a user interface for a user input. The input/output unit 130 may output stored graphic data, visual data, auditory data, and vibration data under the control by the memory unit 140.

The input/output unit 130 may be implemented as any of various display panels. For example, the display panel may be implemented by using any of various display technologies such as liquid-crystal display (LCD), organic light-emitting diodes (OLED), active-matrix organic light-emitting diode (AM-OLED), liquid crystal on silicon (LCoS), or digital light processing (DLP). Also, the input/output unit 130 may be coupled as a flexible display to at least one of a front area, a side area, and a rear area of a display panel.

The input/output unit 130 may be implemented as a touch screen having a layer structure. The touch screen may have not only a display function but also a function of detecting a touch input position, a touched area, and a touch input pressure, and may also have a function of detecting a proximity touch as well as a real touch.

The input/output unit 130 may include a user interface for inputting various information to the ECG data processing device 100. Also, the input/output unit 130 may be located at a remote location.

According to an embodiment, the memory unit 140 may store a program for processing and controlling the controller 110 and/or the ECG data processor 200 and may store data input to the ECG data processing device 100 or data output from the ECG data processing device 100. According to an embodiment, the memory unit 140 may store information about a user account or may store game-related information. The memory unit 140 may include a database in which the above pieces of information are stored.

According to an embodiment, the memory 140 may include at least one type of storage medium from among a flash memory-type storage medium, a hard disk-type storage medium, a multimedia card micro-type storage medium, a card-type memory (e.g., an SD or XD memory), a RAM, a static RAM (SRAM), a ROM, an electrically erasable programmable ROM (EEPROM), a programmable ROM (PROM), a magnetic memory, a magnetic disk, and an optical disk. Also, according to an embodiment, programs stored in the memory unit 140 may be classified into a plurality of modules according to their functions. Alternatively, various types may be connected via a network.

According to an embodiment, the communication unit 150 may communicate with an external device of the controller 110. For example, the communication unit 150 may communicate with an external device such as a payment server or an authentication server under the control by the controller 110. Also, the communication unit 1850 may obtain user information or a user input through communication with an external interface.

Figure 3:
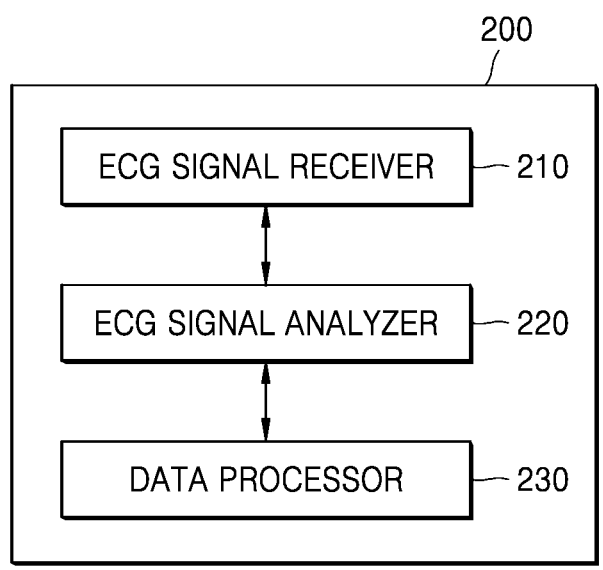
FIG. 3 is a block diagram illustrating an ECG data processor.

The ECG data processor 200 may include an ECG signal receiver 210, an ECG signal analyzer 220, and/or a data processor 230, as shown in FIG. 3.

The ECG signal receiver 210 may receive an ECG signal. The ECG signal receiver 210 may receive an ECG signal from a database or a memory. The ECG signal receiver 210 may receive an ECG signal from an ECG signal measuring device. An ECG signal may be received from the communication unit, and the ECG signal may be used for authentication, verification, etc. to protect personal information.

The ECG signal analyzer 220 may divide an ECG signal into a plurality of segments. The ECG signal may be divided into n segments at pre-determined time intervals. Here, n is a natural number. In an optional embodiment, a time interval may be determined by considering a conversion length of a frequency domain and/or a sampling frequency of a signal.

The ECG signal analyzer 220 may separately classify segments corresponding to a normal section from among segments and may analyze the segments corresponding to the normal section.

In more detail, the ECG signal analyzer 220 may analyze a first segment and may determine whether the first segment is a normal section by comparing a magnitude (e.g., a data value) of a peak value of the first segment with a preset threshold value. Here, the threshold value may be determined based on data values of peaks of segments corresponding to the normal section. The threshold value may be determined using data values of peaks of segments corresponding to the abnormal section. The threshold value may be determined as a result of learning by inputting segments of a normal section. The threshold value may be determined as one of data values of a second segment before the first segment. The threshold value may be determined as a value obtained by adding a certain magnitude to a data value of a template representing a third segment before the first segment. The second segment and the third segment may be any of segments that have occurred temporally before the first segment and may be the same or different from each other. The term 'template' that is related to a representative unit signal in a measured ECG signal may refer to the unit signal itself or a form of the unit signal. The template may refer to information about a reference pattern generated with the highest frequency in the ECG signal and information about a reference pattern generated with the highest frequency in a normal section of the ECG signal. The template may refer to information about an abnormal signal pattern in an abnormal section. The threshold value may be determined in a certain range. The ECG signal analyzer 220 may analyze the first segment and may determine whether the first segment corresponds to a noise section by determining whether a morphological pattern of the first segment deviates from a preset reference pattern.

The ECG data processing device 100 may classify segments that are a normal section or not a noise section and may selectively analyze the segments. In more detail, when the first segment is a normal section, the ECG signal analyzer 220 may classify the first segment as a normal section. Here, the normal section may refer to a section of a normally measured signal, a section of a signal not including noise, a section of a biosignal having a normal function, and the like. When the first segment is a noise section, the ECG signal analyzer 220 may classify the first segment as a noise section. Here, the noise section refers to a signal section including internal noise of the measuring device, noise according to the state of the object, and the like. Since the noise section corresponds to a section that is not normally measured, it is difficult to obtain information about the object even if it is analyzed. Therefore, the noise section can be recognized as a section that does not need to be analyzed. When the first segment is a noise section, but a certain criterion is satisfied, the ECG signal analyzer 220 may classify the first segment as an analysis-required section. The electrocardiogram signal analyzer 220 may classify an analysis required section among the noise sections. The electrocardiogram signal analyzer 220 may classify a noise section having a regular pattern into an analysis required section. The ECG signal analyzer 220 may analyze an ECG signal, may classify segments as a normal section and/or an analysis-required section, and may separately store the segments to analyze the segments as the normal section and/or the analysis-required section.

In another embodiment, the ECG signal analyzer 220 may classify segments as a normal section, a noise section, etc. by adaptively changing a threshold value that is a criterion for determining a normal section. The threshold value for determining whether a segment is a normal section may be determined based on a data value of a peak of a previous segment. In detail, the threshold value may be determined to be k times, for example, twice, a data value of a peak of a previous segment. The threshold value may be set in an appropriate range such as a range between the first value and the second value, a range exceeding the third value, and a range less than or equal to the fourth value. The ECG signal analyzer 220 may determine whether each segment is a normal section by using the determined threshold value.

The ECG signal analyzer 220 may calculate the number of peaks outside an appropriate range of the threshold value in a segment and may determine whether the segment is a normal section based on the number of peaks. When a number of peaks out of the appropriate range exceeds the predetermined number, the ECG signal analyzer 220 may determine that the segment is not a normal section.

Figure 9:
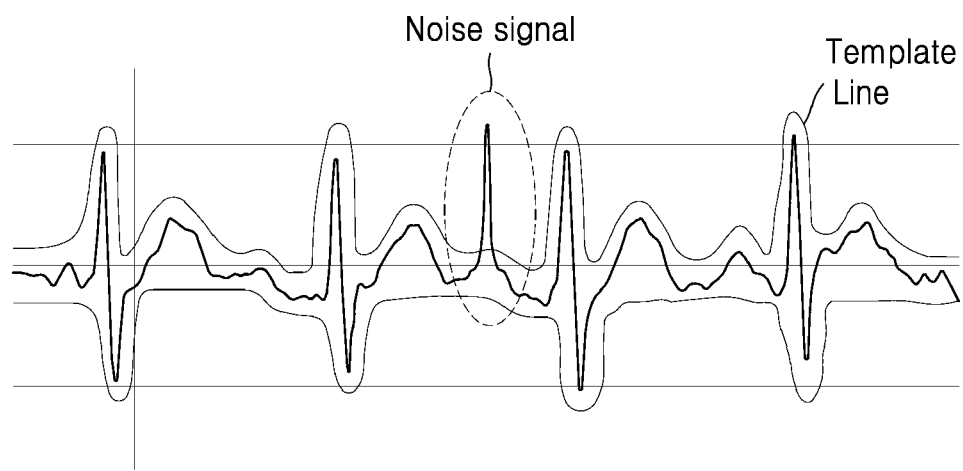
FIG. 9 is a diagram illustrating a reference pattern, according to an embodiment.

In addition, the ECG signal analyzer 220 may determine whether the first segment is a normal section by applying a reference pattern to the first segment. The reference pattern is about noise section of the ECG signal or normal section of the ECG signal. The reference pattern may be determined according to a morphological pattern of a segment of a normal section and may be like a template line of FIG. 9.

When a value obtained by adding a certain value to data values of a signal corresponding to the normal section is a maximum value and a value obtained by subtracting a certain value from the data values is a minimum value, the reference pattern may refer to a pattern determined in a range of the maximum value and the minimum value. The maximum value or the minimum value may be determined as a template line. The template line may be set in units of a period for a signal and may be determined based on a shape of the reference pattern. The reference pattern may be determined in units of periods of a certain heartbeat. The reference pattern may be determined in a range of values determined by a representative signal. The representative signal may refer to a signal that is generated the most. The representative signal may be different for each classification, such as a signal most frequently generated in a normal section, a signal most generated in a noise section, and the like. The reference pattern may be determined in a range of data values of points P, Q, R, S, and T, in a PQRST shape of the representative signal. One or more reference patterns may be set. The ECG signal analyzer 220 may determine a signal that does not deviate from such a reference pattern or template line as a normal section. The ECG signal analyzer 220 may determine a section (segment) of a signal with data deviating from the reference pattern or the template line as an abnormal section. When the ECG signal analyzer 220 changes a threshold value, a reference pattern, or a template line which is a criterion for determining a normal section, the number of segments corresponding to a normal section may be changed. When a preset threshold value increases, the number of segments of a normal section may increase, and when the threshold value decreases, the number of segments of the normal section may decrease. As such, when a threshold value, a reference pattern, or a template line which is a criterion for determining whether a section is a normal section is changed, the number of segments of a normal section may be changed and an analysis time required to analyze one or more segments included in the normal section may also be changed. The threshold value may be a maximum value or a minimum value for determining a template line. The threshold value may be a value for determining a reference pattern.

In more detail, when the number of segments corresponding to a normal section is equal to or less than a certain minimum value, the ECG signal analyzer 220 may change a threshold value that is a criterion for determining a normal section to a larger value. When the threshold value is changed to a greater value, the number of segments corresponding to a normal section may be increased. When the number of segments corresponding to a normal section is equal to or greater than a certain maximum value, the ECG signal analyzer 220 may change a threshold value to a smaller value. When the threshold value is changed to a smaller value, the number of segments corresponding to a normal section may be reduced. Through this process, the amount (data size) of segments corresponding to a normal section to be analyzed may be adjusted.

In more detail, the ECG signal analyzer 220 may determine a segment included in a reference pattern as a segment of a normal section based on the reference pattern.

The ECG signal analyzer 220 may classify a segment including a peak deviating from a peak deviating threshold value, a reference pattern, or a template line as a section that is not a normal section, for example, a noise section. In the segment classified as a section that is not a normal section, for example, a noise section, regularity of peaks deviating from the peak deviating threshold value, the reference pattern, or the template line may be determined, and when the peaks deviating from the peak deviating threshold value, the reference pattern, or the template line regularly occur, this section may be classified as an analysis-required section. When there are peaks deviating from the threshold value, the reference pattern, or the template line, but the peaks regularly occur, the peaks may be considered as a part of an ECG signal that is normally measured. Accordingly, a segment or a signal section including the peaks regularly deviating from the peak deviating threshold value, the reference pattern, or the template line may not be a noise section but may be an analysis-required section.

Regularity of peaks may be determined based on the number of peaks included in a segment and positions of the peaks in the segment. In more detail, when the number of peaks is a pre-determined constant value or in a pre-determined certain range, it may be determined that the peaks have regularity. When an interval between time values of positions of peaks is a pre-determined constant value or in a pre-determined certain range, it may be determined that the peaks have regularity.

In addition, the ECG signal analyzing unit 220 may convert a segment of an ECG signal into a frequency domain and may classify the changed segment as one of a normal section, a noise section, and an analysis-required section. The ECG signal analyzer 220 may convert a segment of an ECG signal into a frequency domain and may determine whether the segment is a normal section by using a threshold value, a reference pattern, or a template line determined in the frequency domain.

The data processor 230 may process each segment of a normal section or an analysis-required section determined through the above method by using a certain method. The data processor 230 may process a segment of an analysis-unrequired section by using another pre-determined method. The term "analysis-unrequired section" may refer to a section other than an analysis-required section or a normal section. The analysis-unrequired section may include a noise section. Because a noise section that is a section including noise during measurement has no need for analysis, the noise section may be classified as an analysis-unrequired section.

As in an embodiment, when a segment corresponding to an analysis-required section is extracted and only the segment of the analysis-required section is analyzed, the amount of data used to perform an additional classification or analysis process for an ECG signal may be reduced, and an analysis time, power, and memory capacity required for the additional classification or analysis process may be reduced.

The data processor 230 may classify a normal section, an analysis-required section, and a noise section as separate groups, and may process segments belonging to each group by using a certain method. The data processor 230 may transmit data of segments belonging to a determined group to an external device. The electrocardiogram data processing unit 200 may output processed data through the input/output device 130. The electrocardiogram data processing unit 200 may output examples of threshold values serving as a reference for the normal section and information on the number of segments classified by each threshold value. The user may select one threshold value among the output data so that segments of a normal section or an analysis required section classified by the selected threshold value are output. Data on segments corresponding to the noise section may be output through an output device.

Figure 4:
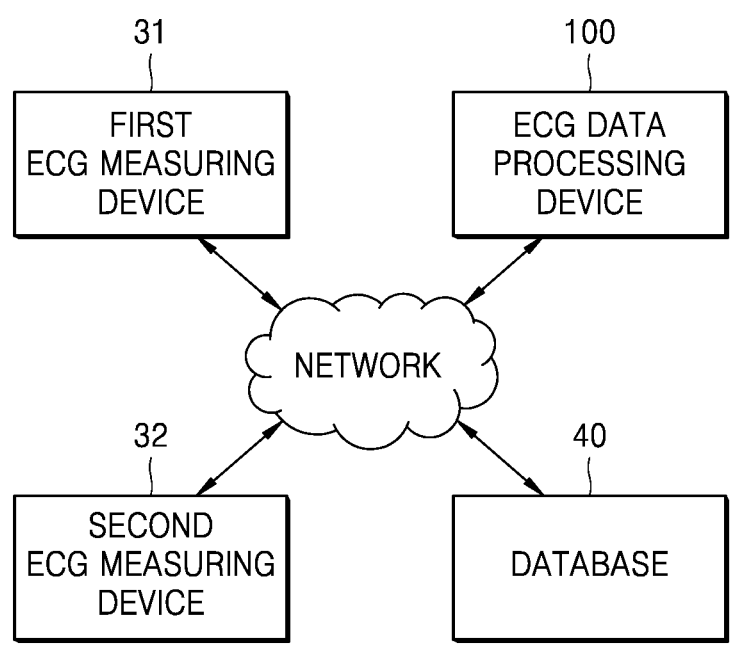
FIG. 4 is a diagram illustrating an ECG signal measuring system for obtaining an ECG signal, according to embodiments.

FIG. 4 is a diagram illustrating an ECG signal measuring system 2 for obtaining an ECG signal, according to embodiments.

The ECG signal measuring system 2 may include the ECG data processing device 100, a first ECG measuring device 31, and a second ECG measuring device 32. Although the first ECG measuring device 31 and the second ECG measuring device 32 are illustrated in FIG. 4, additional ECG measuring devices may be further included. The first ECG measuring device 31 and the second ECG measuring device 32 may be a patch-type measuring device or a holter-type measuring device, but the disclosure is not limited thereto, and various measuring devices may be included.

The ECG data processing device 100 may receive ECG signals from the first ECG measuring device 31 and/or the second ECG measuring device 32 through a network. The network may include all communication methods such as communication through a certain communication standard, a certain frequency band, a certain protocol, and a certain channel. For example, the communication methods may include communication methods through Bluetooth, BLE, Wi-Fi, Zigbee, 3G, LTE, and ultrasound, and may include short-range communication, long-range communication, wireless communication, and wired communication may all be included. However, the disclosure is not limited thereto. According to an embodiment, a short-range communication method may refer to a communication method in which communication may be performed only when a device (e.g., a terminal or a server) performing communication is within a certain range, and may include, for example, Bluetooth and NFC. A long-range communication method may refer to a communication method in which a device performing communication may communicate regardless of a distance. For example, a long-range communication method may refer to a method in which two devices performing communication through a repeater such as an AP may communicate even at a certain distance or more and may include a communication method using a cellular network (e.g., 3G or LTE) such as a telephone or short message service (SMS).

The ECG data processing device 100 may receive an ECG signal from a device such as a database 40. The ECG data processing device 100 may receive an ECG signal and a signal for ECG signal processing from the first ECG signal measuring device 31, the second ECG signal measuring device 32, or the database 40. The ECG data processing device 100 may process the received ECG signal in response to the signal for ECG signal processing. The ECG data processing device 100 may receive a measured ECG signal, may classify the ECG signal into a segment of a normal section, a segment of a noise section, and a segment of an analysis-required section, and may process a segment of each section by using each method. The ECG data processing device 100 may receive and analyze ECG signals from measuring devices that are connected via the network.

Figure 5:
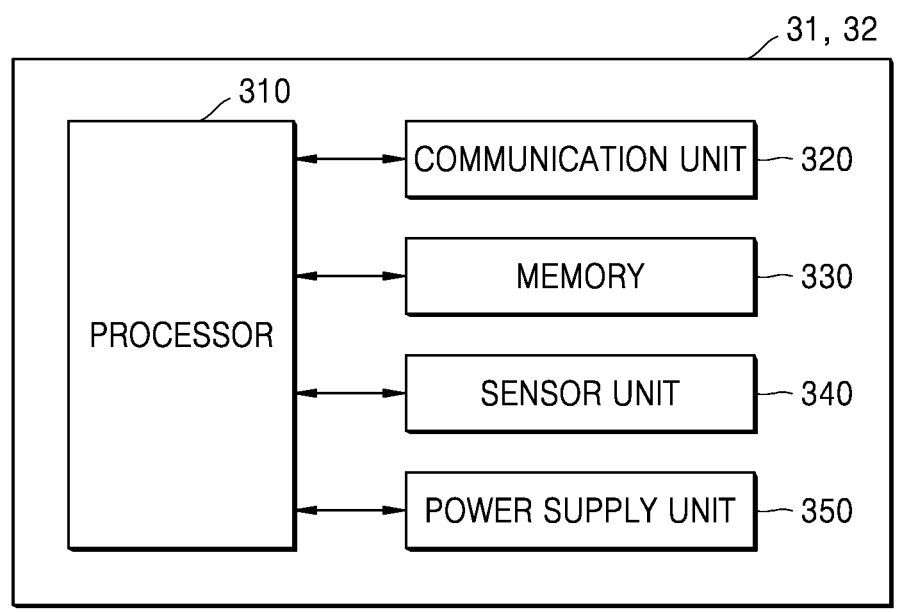
FIG. 5 is a block diagram illustrating any of ECG signal measuring devices.

FIG. 5 is a block diagram illustrating any of the ECG signal measuring devices 31 and 32.

Each of the ECG signal measuring devices 31 and 32 may include a processor 310, a communication unit 320, a memory 330, a sensor unit 340, and a power supply unit 350. Each of the ECG signal measuring devices 31 and 32 may be non-invasively or invasively mounted on an object and may measure an ECG according to a heartbeat of the object. Each of the ECG signal measuring devices 31 and 32 may be attached to the skin or body of the object, but the disclosure is not limited thereto, and each of the ECG signal measuring devices 31 and 32 may be implemented in various ways. Here, the object may be a human, an animal, or a body part of a human or an animal such as a chest, but the disclosure is not limited thereto. The object may be any object as long as an ECG may be detected or measured. Also, an ECG refers to a graphical recording of a potential change on a body surface according to a mechanical activity of a heartbeat such as myocardial contraction/expansion. When an 'ECG is detected,' it may mean that 'a potential occurring on a body surface according to a heartbeat of an object is detected.'

The processor 310 may generally control elements such as the communication unit 320, the memory 330, the sensor unit 340, and the power supply unit 350.

The processor 310 may store an ECG signal measured by the sensor unit 340 in the memory 330. The processor 310 may transmit data such as the ECG signal stored in the memory 330 to an external device. The processor 310 may receive a control signal from the external device and may process the data such as the ECG signal according to the control signal. The processor 310 may process the data such as the ECG signal in response to a control signal stored in the memory 330.

In another embodiment, the processor 310 may not only measure the ECG signal but also may analyze and process the ECG signal. In more detail, the processor 310 may divide the ECG signal into a plurality of segments. The ECG signal may be divided into n segments at pre-determined time intervals. The processor 310 may classify the segments of the measured ECG signal as a normal section, a noise section, and an analysis-required section. The processor 310 may analyze a second segment and may determine whether the second segment is a normal section by comparing a magnitude of a peak value of the second segment with a preset threshold value. The magnitude of the peak value may be a measured potential value or a frequency value of the peak. Here, the threshold value may be determined based on data values of peaks of segments corresponding to the normal section. The threshold value may be determined using data values of peaks of segments corresponding to the abnormal section. The threshold value may be determined as a result of learning by inputting segments of a normal section. When the second segment is not a normal section, the processor 310 may classify the second segment as a noise section or an analysis-required section by considering magnitudes of peaks, a morphological pattern, and a frequency spectrum distribution. The morphological pattern may mean a template. The template may refer to information about a reference pattern generated with the highest frequency in the ECG signal and information about a reference pattern generated with the highest frequency in a normal section of the ECG signal. The template may refer to information about an abnormal signal pattern in an abnormal section.

A criterion for determining a normal section may be a data value and may set to a pre-determined peak deviating threshold value. A criterion for determining a noise section may be a morphological pattern and may be set according to regularity of peaks deviating from the peak deviating threshold value. That is, a segment in which peaks deviating from the peak deviating threshold value regularly occur may be an analysis-required section, and a segment in which peaks deviating from the peak deviating threshold value irregularly occur may be a noise section.

The communication unit 320 may communicate with another device through a network.

The memory 330 may store an ECG signal sensed by the sensor unit 330. The memory 330 may store a control signal for an ECG signal and may store an ECG signal that is processed or analyzed in response to the control signal. The memory 330 may store one or more sensed ECG signals. The memory 330 may store a sensed first ECG signal and may store a part of a sensed second ECG signal. In another embodiment, the memory 330 may store data processed by the processor 310.

Optionally, the memory 330 may store data about criteria for dividing a normal section, a noise section, and an analysis-required section.

The sensor unit 340 for detecting a change in physical and chemical phenomena occurring in a human or an animal may sense a value such as body temperature, pulse, ECG, brain waves, respiratory rate, steps, stress, hormone, exercise, consumed calories, body fact, body moisture, blood sugar value, or blood pressure.

The power supply unit 350 may supply power to each element of each of the ECG signal measuring devices 31 and 32. Data processed by the processor 310 may be output through an output device. The processed data may include segments corresponding to a normal section, segments corresponding to a noise section, segments corresponding to an analysis required section, and information on these segments.

Figure 6A:
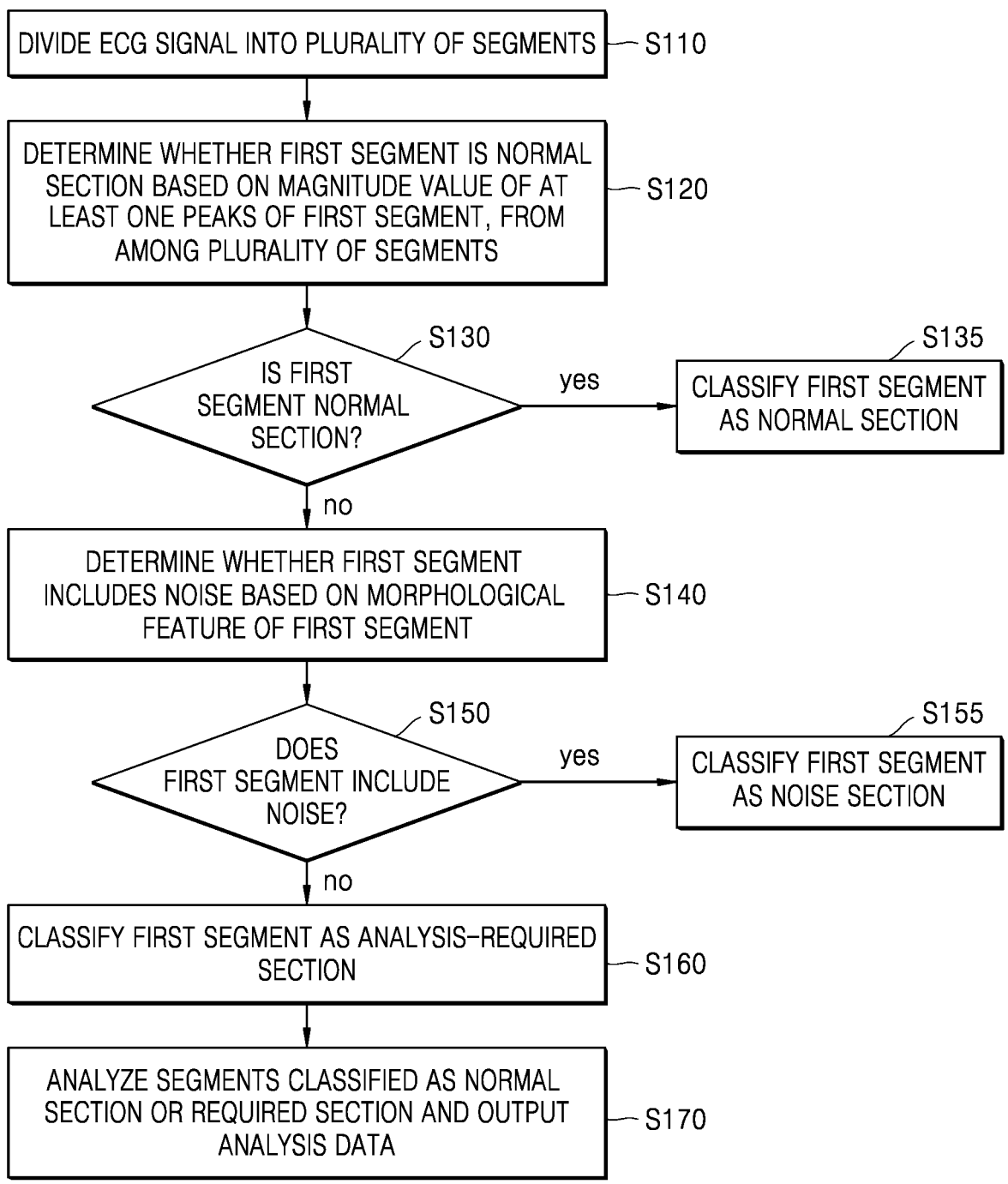
FIG. 6A is a flowchart illustrating a method of setting an analysis-required section of an ECG signal, according to embodiments.

FIG. 6A is a flowchart illustrating a method of setting each segment of an ECG signal as a section, according to embodiments.

As shown in FIG. 6A, in operation S110, the ECG data processing device 100 may divide an ECG signal into a plurality of segments. A time length of a segment may be changed, and may be set, for example, in units of 20 seconds to 30 seconds. A time length of a segment may be determined based on an ECG period of an object.

In operation S120, the ECG data processing device 100 may determine whether a first segment is a normal section based on a magnitude value of at least one peak of the first segment, from among the plurality of segments. The ECG data processing device 100 may determine whether the first segment is a normal section based on a reference pattern including an appropriate range of magnitude values for each period. The ECG data processing device 100 may determine whether the first segment is a normal section based on the magnitude of at least one peak value of the first segment. The ECG data processing device 100 may determine whether the first segment is a normal section based on whether the number of peaks exceeding a threshold in the first segment exceeds a predetermined number. Optionally, the ECG data processing device 100 may determine whether the first segment is a normal section based on whether the first segment includes a signal deviating from the reference pattern.

In operation S130, the ECG data processing device 100 may determine whether the first segment is a normal section. The ECG data processing device 100 may determine whether a magnitude value of at least one peak of the first segment is within the range of a threshold value, by comparing the magnitude vale of the first segment with the preset threshold value or the reference pattern. The threshold value may be determined based on a data value of a segment that is temporally generated before the first segment. Optionally, the threshold value may be set to be twice the data value of the peak of the previous segment.

In operation S135, the ECG data processing device 100 may classify the first segment as a normal section through the above process. When an ECG electrode is poorly attached to the skin, a measured ECG signal may include noise in which a magnitude of a signal decreases. As the magnitude of the measured signal decreases, the magnitude of the peak periodically occurring in the normal signal may be measured too small. In this case, the peak in the signal may not be recognized or detected. In this case, the first segment including only the peaks included in the threshold may correspond to a normal section but may include a noise section of poor skin adhesion when measuring an electrocardiogram signal. In operation S140, if the first segment is not a normal section, the ECG data processing device 100 may extract a morphological pattern of the first segment and may determine whether the first segment includes noise based on the morphological pattern of the first segment. In more detail, when the first segment includes peaks out of the range of the preset threshold value, the ECG data processing device 100 may extract time regularity of the peaks out of the range of the threshold value as a morphological pattern of the first segment. A segment in which peaks out of the range of the threshold value regularly occur may not be noise and may be classified as an analysis-required section. A segment in which peaks out of the range of the threshold value irregularly occur may be classified as a noise section. That is, a section having peaks out of the range of a certain threshold value and having no time regularity between the peaks may be classified as a noise section. When there is no time regularity between peaks out of the range of a threshold value, it may mean that there is no regularity between times at which the peaks greater than the threshold value occur. A segment including noise such as poor attachment to the skin may be detected as a segment in which peaks irregularly occur.

In operation S150, the ECG data processing device 100 may determine whether the first segment includes noise through the above process.

In operation S155, when the first segment includes noise, the ECG data processing device 100 may classify the first segment as a noise section. In operation S160, when the first segment does not include noise, the ECG data processing device 100 may classify the first segment as an analysis-required section.

In operation S170, the ECG data processing device 100 may analyze segments classified as a normal section or an analysis-required section. The ECG data processing device 100 may generate analysis data obtained by analyzing the segments. The ECG data processing device 100 may output the analysis data through an output device.

Figure 6B:
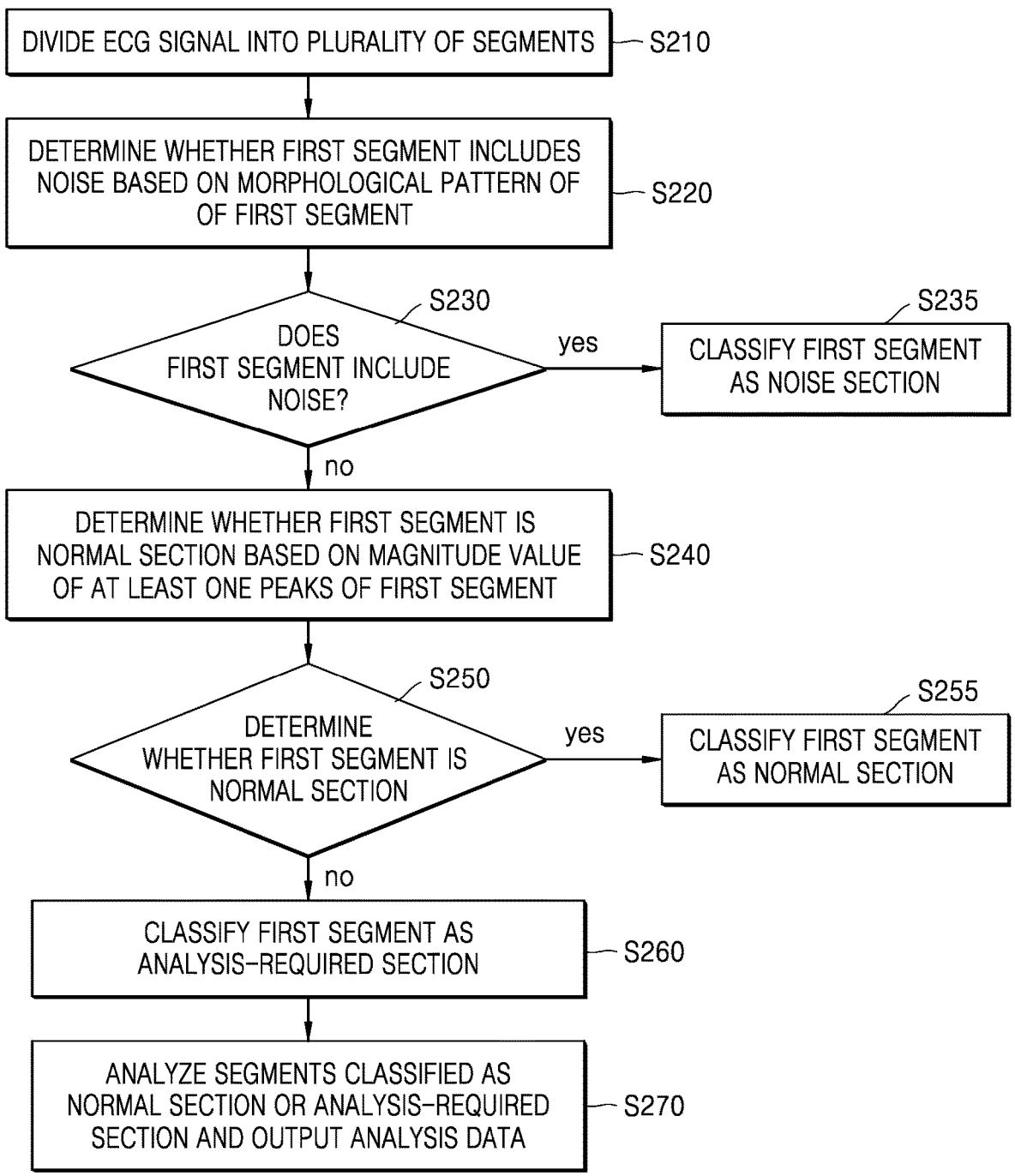
FIG. 6B is a flowchart illustrating a medical data classification method, according to embodiments.

FIG. 6B is a flowchart illustrating an ECG data processing method, according to embodiments. As shown in FIG. 6B, in operation S210, the ECG data processing device 100 may divide an ECG signal into a plurality of segments. A time length of a segment may be changed, and may be set, for example, in units of 20 seconds or 30 seconds. A time length of a segment may be determined based on an ECG period of an object.

In operation S220, the ECG data processing device 100 may extract a morphological pattern of a first segment from among the plurality of segments and may determine whether the first segment includes noise based on the morphological pattern of the first segment. In more detail, when the first segment includes peaks out of a range of a preset threshold value, the ECG data processing device 100 may extract regularity of the peaks out of the range of the threshold value as a morphological pattern of the first segment. A segment in which peaks out of a range of a threshold value regularly occur may not be noise and may be classified as an analysis-required section. A segment in which peaks out of a range of a threshold value irregularly occur may be classified as a noise section. That is, a section having peaks out of a range of a threshold value and having no time regularity between the peaks may be classified as a noise section. When there is no time regularity between peaks out of a range of a threshold value, it may mean that there is no regularity between times at which the peaks equal to or greater than the threshold value occurs.

In operation S230, the ECG data processing device 100 may determine whether the first segment includes noise based on a morphological pattern of the first segment and time regularity of peaks. In more detail, whether the first segment includes noise may be determined based on regularity of the peaks out of a range of the threshold value in the first segment.

In operation S235, the ECG data processing device 100 may classify the first segment as a noise section through the above process. In operation S240, when the first segment does not include noise, the ECG data processing device 100 may determine whether the first segment is a normal section based on a magnitude value of at least one peak of the first segment.

In operation S250, the ECG data processing device 100 may determine whether the first segment is a normal section through the above process.

In operation S255, when the magnitude value of at least one peak of the first segment is within the threshold value or magnitude values of at least one of the first segment are included in the reference pattern, the ECG data processing device 100 may classify the first segment as a normal section. When it is detected that the magnitude of the measured signal remains small for more than a pre-determined time, even when the magnitude value of the first segment is within a range of the threshold value, the first segment is not classified as a normal section. The pre-determined time may be determined based on a unit time based on a heart rate.

In operation S260, when the first segment does not include noise and is not a normal section, the ECG data processing device 100 may classify the first segment as an analysis-required section.

In operation S270, the ECG data processing device 100 may analyze segments classified as a normal section or an analysis-required section. The ECG data processing device 100 may generate analysis data obtained by analyzing the segments. The ECG data processing device 100 may output the analysis data through an output device.

Figure 7:
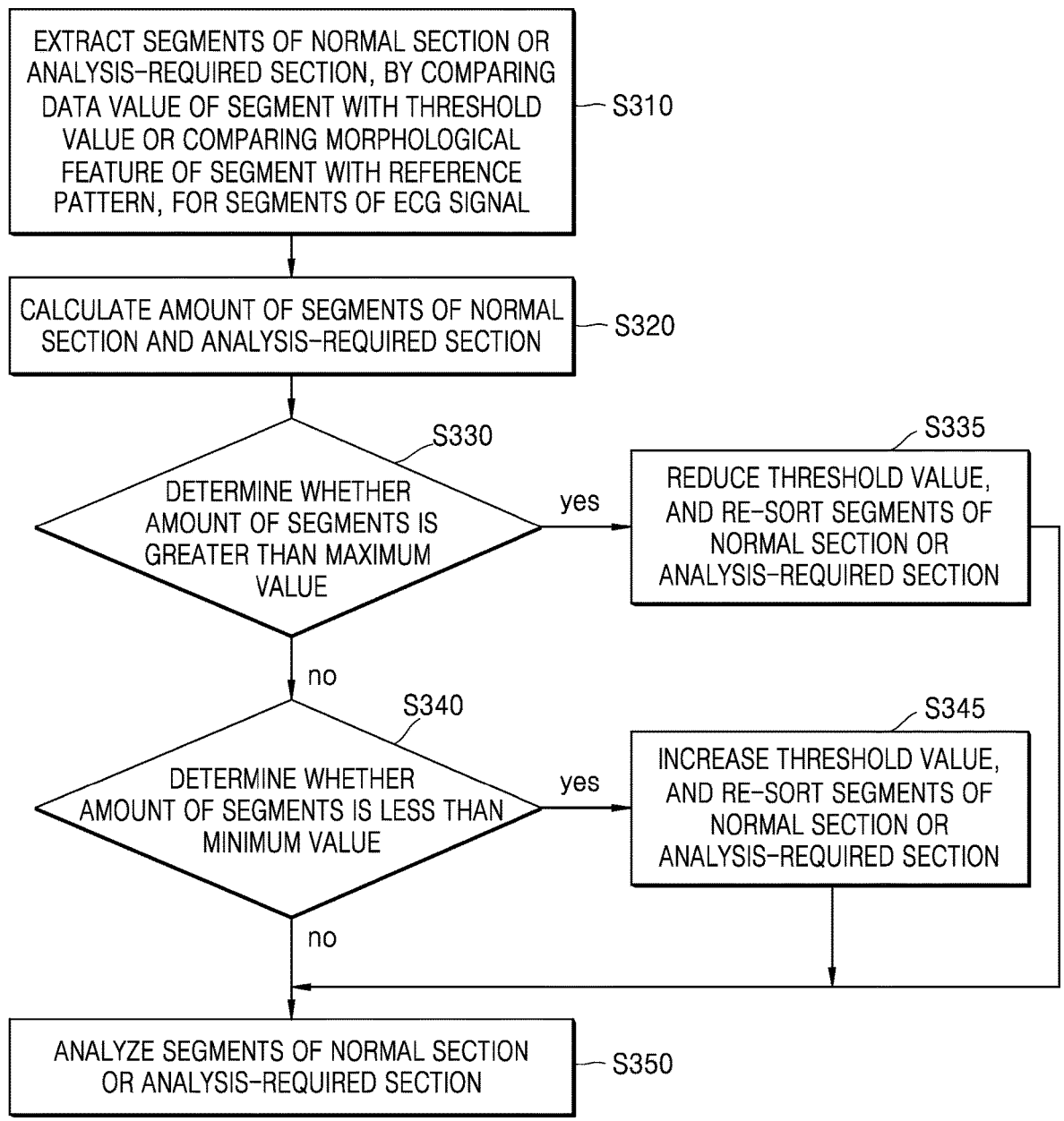
FIG. 7 is a flowchart illustrating a method of changing a threshold value for determining a normal section or an analysis-required section, according to embodiments.

FIG. 7 is a flowchart illustrating a method of changing a threshold value for determining a normal section or an analysis-required section, according to embodiments.

In operation S310, the ECG data processing device 100 may extract segments of a normal section or an analysis-required section, by comparing a data value of a segment with a threshold value or comparing a morphological pattern of a segment with a reference pattern, for segments of an ECG signal. The ECG data processing device 100 may calculate a number of peaks exceeding the threshold value, a presence of a peak that deviates from the peak deviating threshold value, whether a signal out of the reference pattern is detected, the temporal regularity of the peaks exceeding the threshold value, etc. have. The ECG data processing device 100 may classify segments of a normal section or an analysis required section by using the processed result. The ECG data processing device 100 may extract a segment of a normal section and a segment of an analysis-required section, by using a method of FIG. 6A or FIG. 6B.

In operation S320, the ECG data processing device 100 may calculate the number, amount, or magnitude of segments corresponding to the normal section or the analysis-required section.

In operation S330, the ECG data processing device 100 may determine whether the number of segments is greater than a maximum value. In operation S335, when the number or number of segments is greater than a preset maximum value, the ECG data processing device 100 may reduce the threshold value and may re-sort segments of a normal section or an analysis-required section. The maximum value may be determined based on a preset maximum analysis time value. The maximum value may be determined based on the amount or number of segments which may be processed within the preset maximum analysis time value.

In operation S340, when the number or number of segments is less than the maximum value, the ECG data processing device 100 may determine whether the number of segments is less than a minimum value.

In operation S345, when the number or number of segments is less than the minimum value, the ECG data processing device 100 may increase the threshold value that is a criterion for determining a normal section or an analysis-required section and may re-sort segments of a normal section or an analysis-required section. When the threshold value is increased, the number of segments corresponding to a normal section, or an analysis-required section may increase.

In operation S350, when the number of segments exceeds the minimum value, the ECG data processing device 100 may analyze the segments of the normal section or the analysis-required section. The ECG data processing device 100 may generate a signal for analysis and analyze segments corresponding to the normal section and the analysis required section. Here, the minimum value may be determined based on an average value of the number of segments corresponding to a normal section or an analysis-required section in a measured ECG signal. The minimum value may be determined based on an average value of the number of segments corresponding to a normal section or an analysis-required section in a plurality of ECG signals.

Figure 8A:
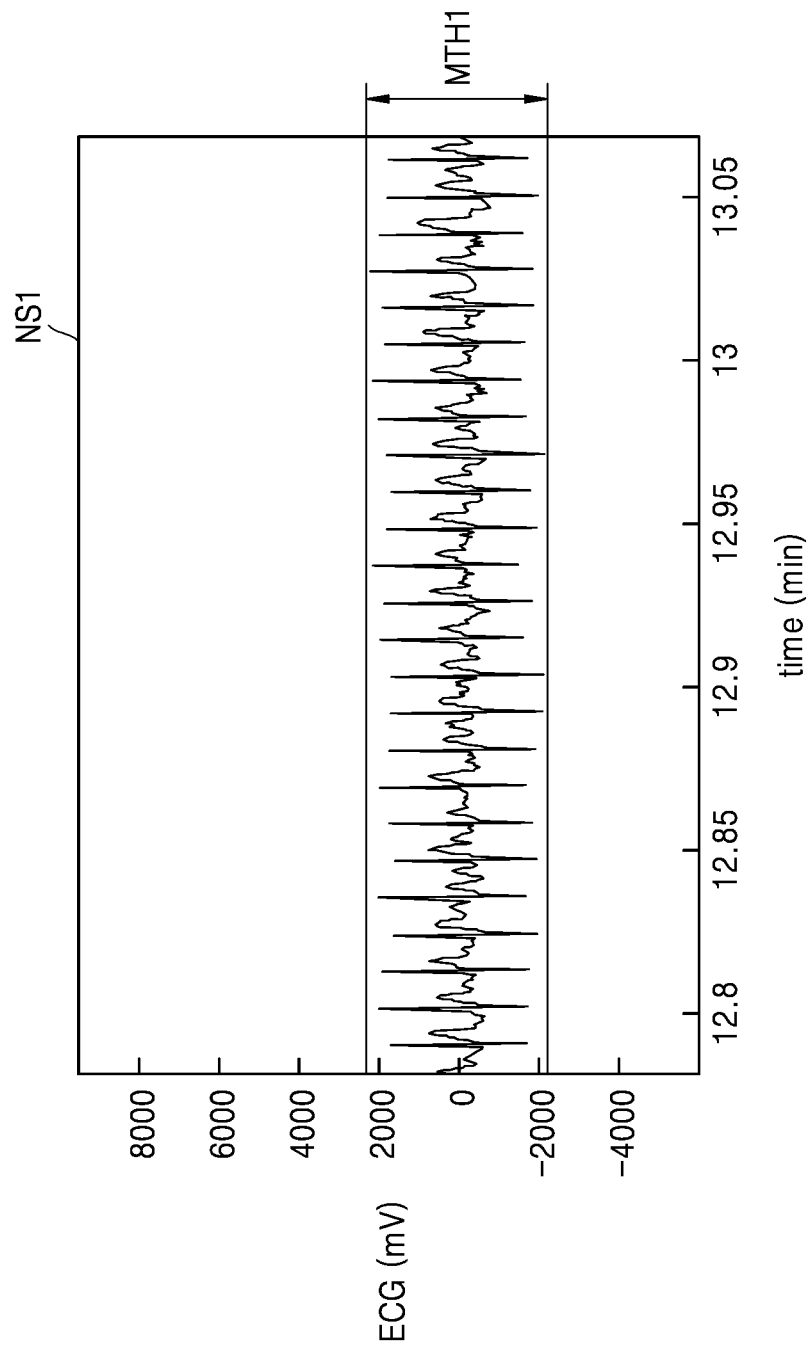
FIG. 8A is a diagram illustrating an ECG signal of a normal section.

FIG. 8A is a diagram illustrating an ECG signal of a normal section.

As shown in FIG. 8A, an ECG signal NS1 of a normal section may include only peaks within an appropriate range MTH1. The appropriate range may be determined by a threshold value, a reference pattern, or a template line. The appropriate range may be determined by using a shape, a form, and a data value of a representative signal of a measured ECG signal.

Figure 8B:
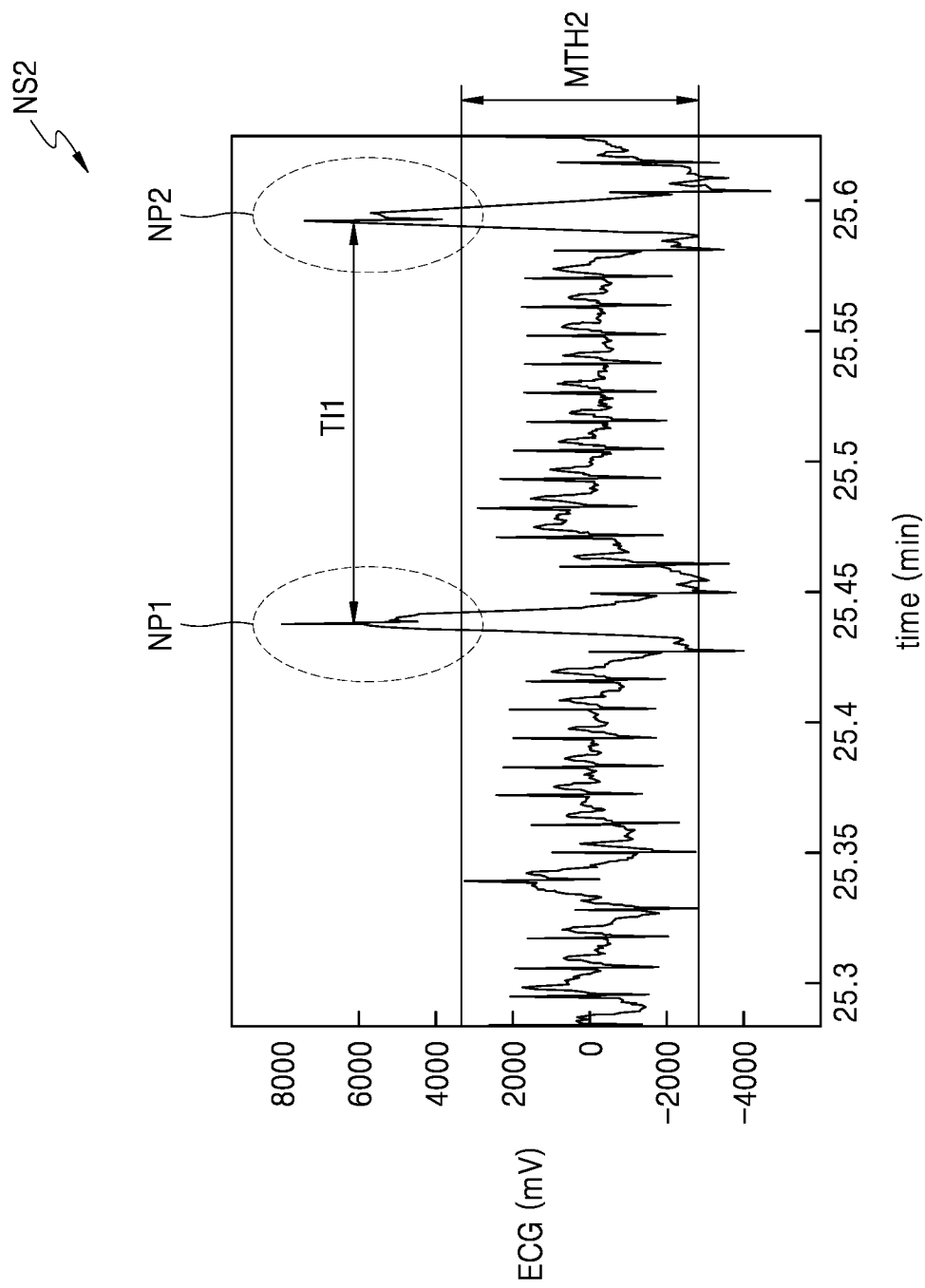
FIG. 8B is a diagram illustrating an ECG signal of a section other than a normal section.

FIG. 8B is a diagram illustrating an ECG signal of a section other than a normal section. As shown in FIG. 8B, an ECG signal NS2 may include peaks outside an appropriate range MTH2. An ECG data processing device may determine whether a segment is a noise section based on a time interval TI1 of the peaks outside the appropriate range in the ECG signal. When the time interval TI1 of the peaks is constant, it may mean that the peaks regularly occur. When data values of the peaks are constant, it may also mean that the peaks regularly occur. The peaks that regularly occur are not noise, and thus, the section may be classified as an analysis-required section.

Figure 8C:
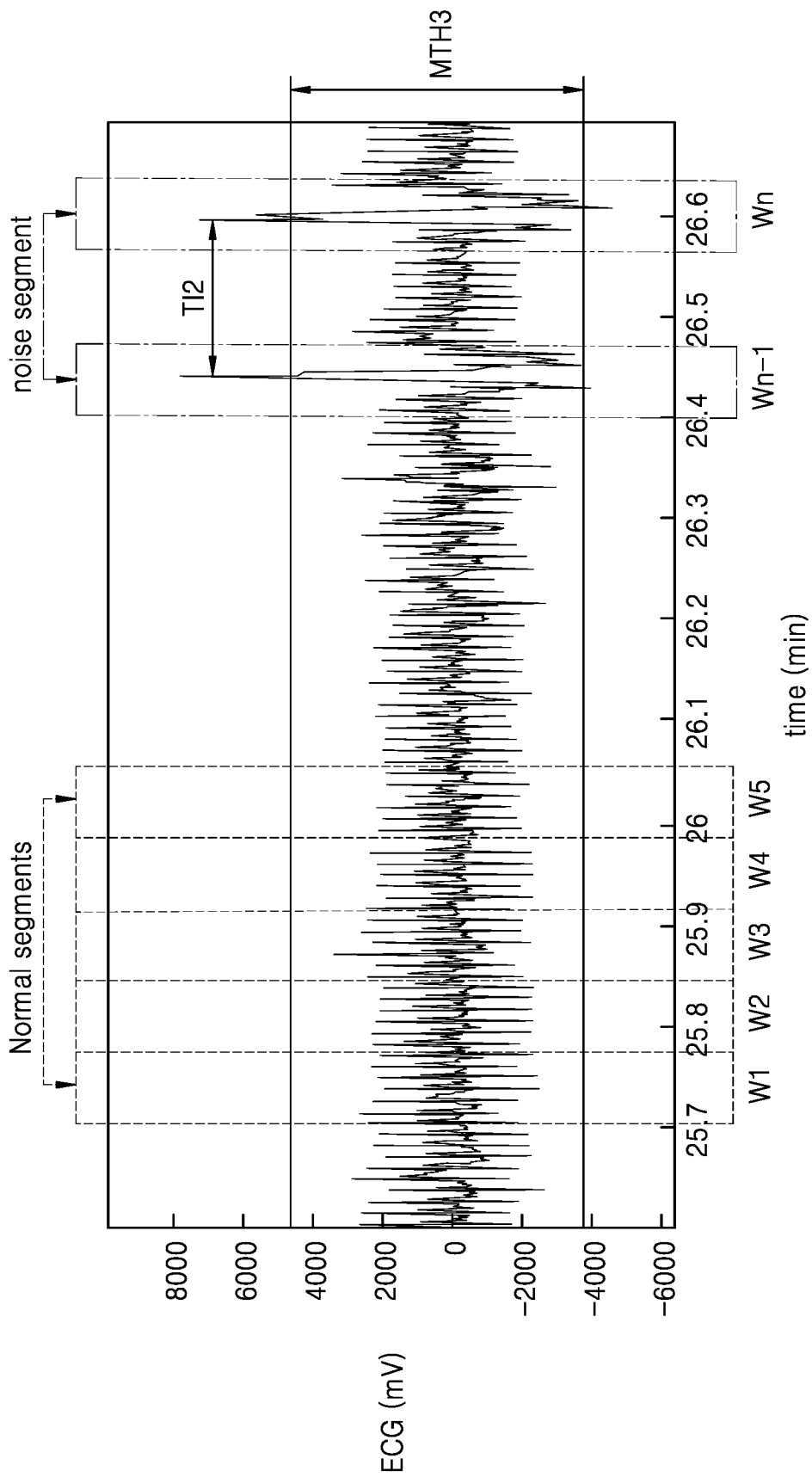
FIG. 8C is another diagram illustrating an ECG signal.

FIG. 8C is a diagram illustrating an ECG signal.

As shown in FIG. 8C, an ECG signal may include segments W1, W2, W3, W4, and W5 of a normal section and segments W_n−1 and W_n of a noise section.

It may be determined whether the segments W_n−1 and W_n of the noise section need to be analyzed, by calculating a time interval TI2 between peaks of the segments of the noise section.

Figure 10A:
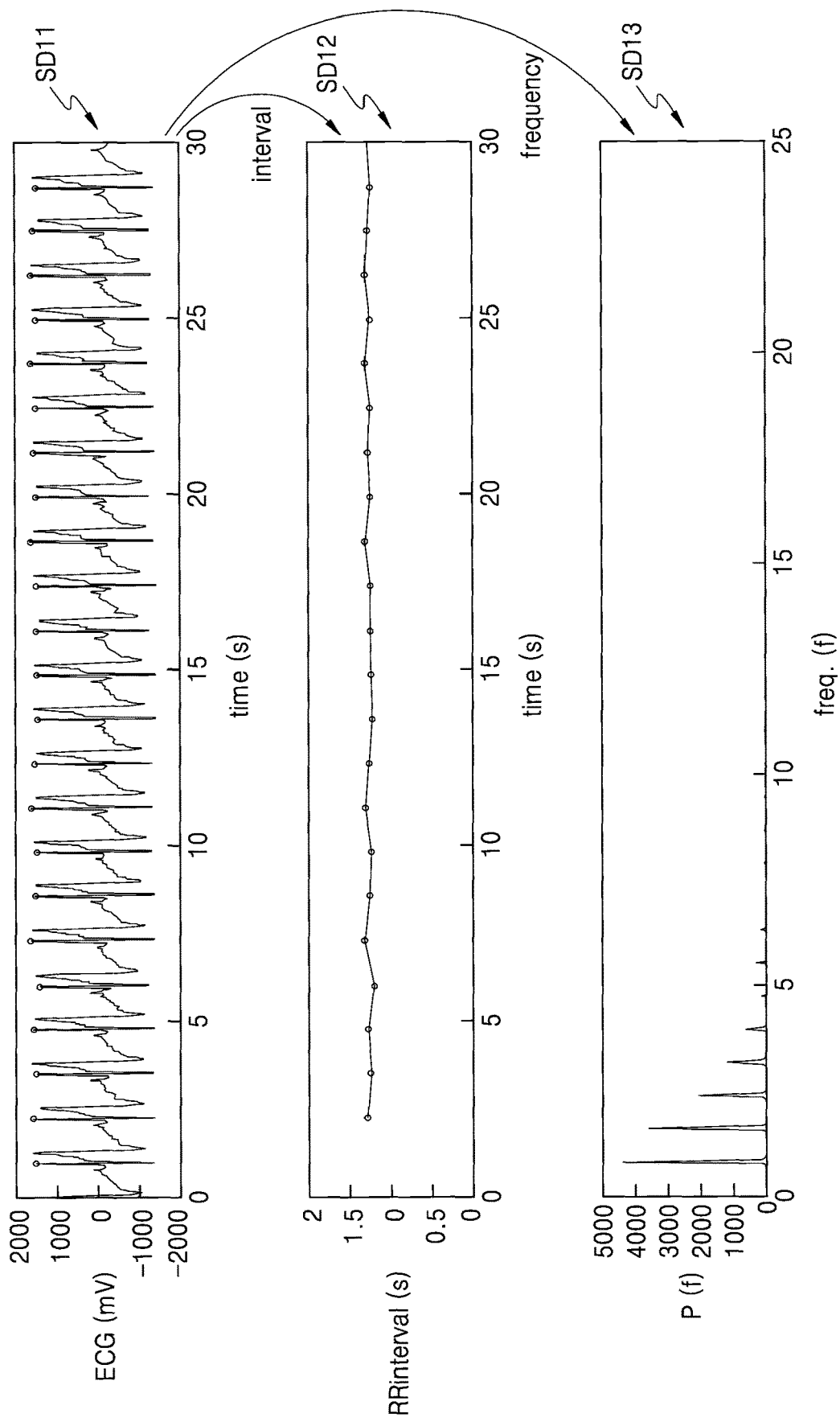
FIG. 10A is a diagram illustrating that an ECG signal of a normal section is converted and processed into a frequency domain, according to an embodiment.

FIG. 10A is a diagram illustrating that an ECG signal of a normal section is converted and processed into a frequency domain, according to an embodiment.

The ECG data processing device 100 according to embodiments may divide an ECG signal at time intervals and may extract a length of each time interval as in SD12.

The ECG data processing device 100 may convert an ECG signal SD11 into a frequency domain and may generate a graph SD13 of a frequency value.

The ECG data processing device 100 may convert a plurality of segments of an ECG signal into a frequency domain and may determine whether a frequency value exceeds a preset frequency threshold value. The ECG data processing device 100 may convert a plurality of segments of an ECG signal into a frequency domain and may calculate an area formed by a graph of a frequency value. The ECG data processing device 100 may determine whether the area formed by the graph of the frequency value exceeds a preset area threshold value.

As shown in FIG. 10A, when an ECG signal SD11 has a constant time interval, a frequency value may have a certain interval value. When a distribution of frequency values of segments is concentrated on a certain value as in SD13, the signal may be determined as a normal section. The time intervals of the ECG signal SD11 are the same as SD12. A signal obtained by converting the ECG signal SD11 into a frequency dimension is equal to SD13. The time intervals of the ECG signal SD21 are the same as SD12. A signal obtained by converting the ECG signal SD11 into a frequency dimension is equal to SD13.

Figure 10B:
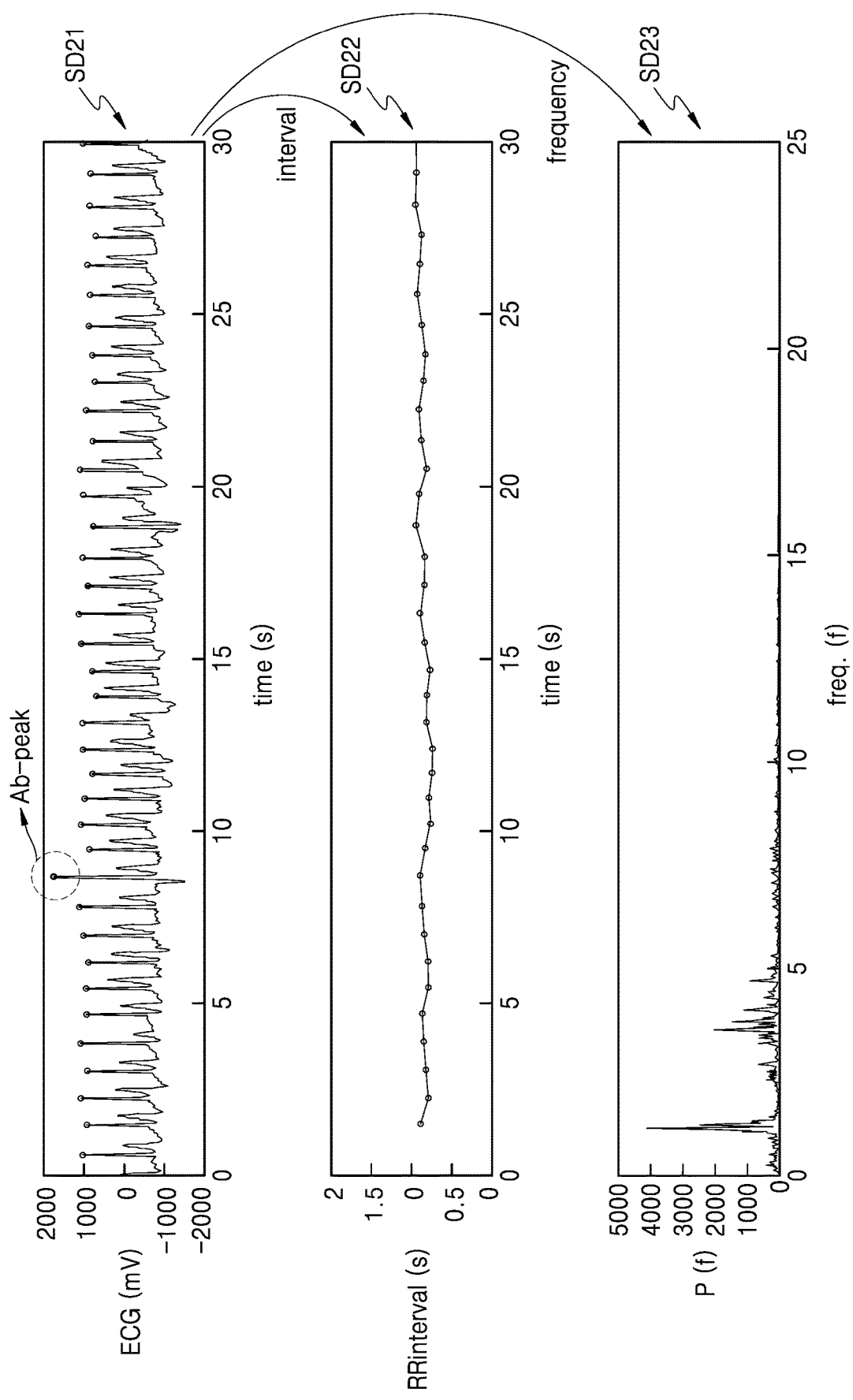
FIG. 10B is a diagram illustrating that an ECG signal of a section other than a normal section is converted and processed into a frequency domain, according to an embodiment.

FIG. 10B is a view illustrating that an ECG signal of a section other than a normal section is converted and processed into a frequency domain, according to an embodiment.

The ECG data processing device 100 may represent a time interval of peaks of an ECG signal SD21 as a graph SD22.

The ECG data processing device 100 may calculate a frequency value of the ECG signal SD21 as in SD23. Unlike SD13 of FIG. 10A, data values of peaks may include a peak Ab-peak outside a normal range. The signal of SD13 may include a peak having a harmonic frequency with respect to a fundamental frequency of a peak. In this case, the ECG data processing device 100 may determine whether the signal is a normal section by considering a ratio of the number of peaks having a harmonic frequency. As in SD13, in a signal of a normal section, peaks having a harmonic frequency occur at a high ratio with respect to all peaks. The signal in the normal section refers to a signal in which an occurrence rate of a peak having a harmonic frequency is higher than a predetermined ratio. The predetermined ratio may be determined as an average value of the generation ratio of harmonic frequencies for each section in the entire signal. As in SD23, in a signal of an abnormal section, peaks having a harmonic frequency occur at a low ratio with respect to all peaks or do not occur. The ECG data processing device 100 may determine whether a signal is a normal section, a noise section, or an analysis-required section, by considering such a frequency spectrum distribution. The ECG data processing device 100 may determine whether the signal is a normal section, a noise section, or an analysis required section based on frequency values of peaks in the signal.

Although the embodiments have been described by the limited embodiments and the drawings as described above, various modifications and variations are possible by one of ordinary skill in the art from the above description. For example, the described techniques may be performed in a different order from the described method, and/or the described elements such as a system, structure, device, and a circuit may be combined or integrated in a different form from the described method or may be replaced or substituted by other elements or equivalents to achieve appropriate results.

According to any of the solutions to the problems, an ECG data processing device and an ECG data processing method may be provided.

Also, according to any of the solutions to the problems, from among ECG signals measured for a long time, not only an ECG signal of a normal section but also an ECG signal of a noise section but satisfying a certain condition may be analyzed.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An electrocardiogram (ECG) data processing method comprising steps of:
    receiving, by an ECG data processing device, an ECG signal;
    dividing, by the ECG data processing device, the ECG signal into a plurality of segments;
    analyzing a first segment from among the plurality of segments; and
    determining whether the first segment is a normal section by comparing a magnitude of at least one peak value of the first segment with a preset first threshold value;
    classifying, by the ECG data processing device, the first segment as a normal section, when peaks deviating from the preset first threshold value is absent in the first segment; and
    classifying, by the ECG data processing device, the first segment as a noise section, wherein, when the first segment is not classified as the normal section, classifying as the noise section further comprises:
        extracting a morphological pattern of the first segment and
        classifying the first segment as the noise section by using the morphological pattern of the first segment; and
    analyzing, by the ECG data processing device, one or more segments other than the normal section, from among the plurality of segments;
    wherein the classifying of the first segment as the noise section further comprises:
    when the magnitude of the at least one peak value of the first segment exceeds the preset first threshold value, determining peak regularity corresponding to the morphological pattern of the first segment;
    classifying the first segment having the peak regularity as an analysis-required section; and classifying the first segment having no peak regularity as
the noise section.

2. The ECG data processing method further comprising:
classifying one or more segments of the normal section included in the ECG signal by repeatedly performing the steps of claim 1, and
calculating an amount of the one or more segments of the normal section.

3. The ECG data processing method of claim 1, further comprising:
repeating the step of determining whether the first segment is the normal section;
repeating the step of classifying the first segment as the normal section; collecting one or more segments of the normal section included in the ECG signal; and calculating an analysis time for the one or more segments.

4. The ECG data processing method of claim 1, wherein the step of determining the peak regularity further comprises determining the peak regularity based on a number of peaks included in the first segment or positions of the peaks in the first segment.

5. The ECG data processing method of claim 1, further comprising adaptively changing the preset first threshold value for each of the plurality of segments.

6. The ECG data processing method of claim 5, wherein the step of determining whether the first segment is the normal section further comprises setting the preset first threshold value as one of:
a data value of a peak of a second segment of the ECG signal; and
a value obtained by adding a certain magnitude to a data value of a template representing a third segment.

7. The ECG data processing method of claim 2, further comprising:
increasing the preset first threshold value, when a number of segments of the normal section is equal to or less than a preset minimum value;
reducing and resetting the preset first threshold value, when the number of the segments of the normal section is equal to or greater than a preset maximum value; and
re-determining the number of segments of the normal section by using a reset first threshold value.

8. The ECG data processing method of claim 5, further comprising determining the preset first threshold value based on a maximum value of a difference value between data values of peaks of a previous segment.

9. The ECG data processing method of claim 1, further comprising, after the dividing of the ECG signal into the plurality of segments, converting the plurality of segments of the ECG signal into a frequency domain,
wherein the determining step further comprises determining whether the first segment is a normal section, by comparing a data value of a frequency domain of the first segment with a second threshold value determined in the frequency domain.

10. The ECG data processing method of claim 9, wherein the determining step further comprises determining whether the first segment is the normal section by considering a ratio of harmonic frequencies, from among frequencies of peaks of the first segment.

11. A non-transitory computer-readable medium comprising executable instructions that, when executed by a processing system including a processor, facilitate performance of operations comprising:
receiving an electrocardiogram (ECG) signal,
dividing the ECG signal into a plurality of segments,
analyzing a first segment from among the plurality of segments;
determining whether the first segment is a normal section by comparing a magnitude of a peak value of the first segment with a preset first threshold value,
classifying the first segment as the normal section, when the first segment not including peaks deviating from the preset first threshold value;
classifying the first segment as a noise section, wherein, when the first segment is not the normal section, extracting a morphological pattern of the first segment and classifying the first segment as the noise section by using the morphological pattern of the first segment, and
analyzing one or more segments other than the normal section, from among the plurality of segments;
wherein classifying of the first segment as the noise section further comprises:
when the magnitude of the peak value of the first segment exceeds the preset first threshold value, determining peak regularity corresponding to the morphological pattern of the first segment;
classifying the first segment having the peak regularity as an analysis-required section; and
classifying the first segment having no peak regularity as the noise section.

12. The non-transitory computer-readable medium, further comprising:
classifying one or more segments of the normal section included in the ECG signal are classified, by repeatedly performing steps of claim 11, and
calculating an amount of the one or more segments of the normal section.

13. The non-transitory computer-readable medium of claim 11, further comprising:
repeating the determining whether the first segment is the normal section;
repeating the classifying of the first segment as the normal section;
collecting one or more segments of the normal section included in the ECG signal; and
calculating an analysis time for the one or more segments.

14. The non-transitory computer-readable medium of claim 12, wherein determining the peak regularity further comprises determining the peak regularity based on a number of peaks included in the first segment or positions of the peaks in the first segment.

15. The non-transitory computer-readable medium of claim 12, further comprising adaptively changing the preset first threshold value is a for each of the plurality of segments.

16. The non-transitory computer-readable medium of claim 12, wherein,
increasing the preset first threshold value when a number of the segments of the normal section is equal to or less than a preset minimum value;
reducing and resetting the preset first threshold value, when the number of the segments of the normal section is equal to or greater than a preset maximum value; and
re-determining the number of segments of the normal section by using a reset threshold value.

17. The non-transitory computer-readable medium of claim 14, further comprising determining the preset first threshold value based on a maximum value of a difference value between data values of peaks of a previous segment.

18. The non-transitory computer-readable medium of claim 11, further comprising:

converting the plurality of segments of the ECG signal into a frequency domain, and determining whether the first segment is the normal section further comprises determining whether the first segment is the normal section by comparing a data value of a frequency domain of the first segment with a threshold value determined in the frequency domain.

* * * * *